United States Patent
Shih et al.

(10) Patent No.: US 10,466,479 B2
(45) Date of Patent: Nov. 5, 2019

(54) HEAD-MOUNTED DISPLAY APPARATUS AND OPTICAL SYSTEM

(71) Applicant: Coretronic Corporation, Hsin-Chu (TW)

(72) Inventors: Chih-Wei Shih, Hsin-Chu (TW); Yi-Sheng Lee, Hsin-Chu (TW); Chung-Ting Wei, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 336 days.

(21) Appl. No.: 15/287,760

(22) Filed: Oct. 7, 2016

(65) Prior Publication Data
US 2018/0101011 A1    Apr. 12, 2018

(51) Int. Cl.
*G02B 27/01* (2006.01)
*F21V 8/00* (2006.01)

(52) U.S. Cl.
CPC ....... *G02B 27/0172* (2013.01); *G02B 6/0028* (2013.01); *G02B 6/0046* (2013.01); *G02B 6/0075* (2013.01); *G02B 27/0101* (2013.01)

(58) Field of Classification Search
None
See application file for complete search history.

(56) References Cited

U.S. PATENT DOCUMENTS

| | | | |
|---|---|---|---|
| 5,076,664 A | 12/1991 | Migozzi | |
| 6,563,626 B1 | 5/2003 | Iwasaki | |
| 6,829,095 B2 | 12/2004 | Amitai | |
| 7,576,916 B2 | 8/2009 | Amitai | |
| 8,189,263 B1 | 5/2012 | Wang et al. | |
| 8,433,172 B2 | 4/2013 | Pascal et al. | |
| 8,743,464 B1 | 6/2014 | Amirparviz | |

(Continued)

FOREIGN PATENT DOCUMENTS

| | | |
|---|---|---|
| CN | 102928981 | 2/2013 |
| CN | 104204905 | 12/2014 |

(Continued)

OTHER PUBLICATIONS

Yaakov Amitai, "P-27: A Two-Dimensional Aperture Expander for Ultra-Compact, High-Performance Head-Worn Displays, " SID Symposium Digest of Technical Papers, May 2005, pp. 360-363.

(Continued)

*Primary Examiner* — William R Alexander
*Assistant Examiner* — Gary W O'Neill
(74) *Attorney, Agent, or Firm* — JCIPRNET (57) ABSTRACT

An optical system including a first optical waveguide device, and a second optical waveguide device is provided. The first optical waveguide device includes a first light entering surface, a first light exiting surface and a first beam splitter. An image light emitted from the display enters the first optical waveguide device through the first light entering surface. The second optical waveguide device includes a second light entering surface, a second light exiting surface and a second beam splitter. The second light entering surface faces the first light exiting surface. A gap is formed between the second light entering surface and the first light exiting surface. Besides, a head-mounted display using the optical system described above is also provided.

17 Claims, 5 Drawing Sheets

(56) References Cited

U.S. PATENT DOCUMENTS

| | | | |
|---|---|---|---|
| 8,810,914 B2 | 8/2014 | Amitai | |
| 9,261,688 B2 | 2/2016 | Takeda et al. | |
| 2003/0165017 A1* | 9/2003 | Amitai | G02B 6/0018 359/636 |
| 2006/0132914 A1* | 6/2006 | Weiss | G02B 5/32 359/462 |
| 2008/0025667 A1 | 1/2008 | Amitai | |
| 2008/0285137 A1 | 11/2008 | Simmonds et al. | |
| 2012/0062850 A1 | 3/2012 | Travis | |
| 2012/0176682 A1 | 7/2012 | DeJong | |
| 2013/0250431 A1* | 9/2013 | Robbins | G02B 27/0172 359/633 |
| 2014/0140653 A1 | 5/2014 | Brown et al. | |
| 2015/0346506 A1 | 12/2015 | Huang et al. | |
| 2016/0004090 A1 | 1/2016 | Popovich et al. | |
| 2016/0124223 A1 | 5/2016 | Shinbo et al. | |
| 2016/0231568 A1 | 8/2016 | Saarikko et al. | |
| 2016/0320621 A1 | 11/2016 | Biteau et al. | |
| 2016/0357013 A1* | 12/2016 | Watanabe | G02B 27/48 |
| 2017/0192230 A1 | 7/2017 | Miyazaki et al. | |

FOREIGN PATENT DOCUMENTS

| | | |
|---|---|---|
| CN | 104503087 | 4/2015 |
| CN | 104656259 | 5/2015 |
| CN | 105116547 | 12/2015 |
| CN | 105393050 | 3/2016 |
| CN | 105572873 | 5/2016 |
| CN | 107329259 | 11/2017 |
| JP | 2007010830 | 1/2007 |
| JP | 2014063173 | 4/2014 |
| JP | 2016110782 | 6/2016 |
| TW | 522256 | 3/2003 |
| TW | 201719233 | 6/2017 |
| WO | 2011024291 | 3/2011 |
| WO | 2012088478 | 6/2012 |
| WO | 2016051439 | 4/2016 |

OTHER PUBLICATIONS

"Search Report of Europe Counterpart Application", dated Mar. 7, 2018, p. 1-p. 8, in which the listed references were cited.

Yaakov Amitai, "P-27: A Two-Dimensional Aperture Expander for Ultra-Compact, High-Performance Head-Worn Displays", SID Symposium Digest of Technical Papers, vol. 36, issue 1, May 2005, pp. 360-363.

"Office Action of Taiwan Counterpart Application", dated May 29, 2018, p. 1-p. 6.

Bernard C. Kress, et al., "Diffractive and Holographic Optics as Optical Combiners in Head Mounted Displays," UbiComp'13, Sep. 8-12, 2013, pp. 1479-1482.

"Office Action of Korea Counterpart Application", dated Jun. 7, 2018, p. 1-p. 5.

* cited by examiner

HEAD-MOUNTED DISPLAY APPARATUS AND OPTICAL SYSTEM

BACKGROUND OF THE INVENTION

Field of the Invention

The invention relates to a display apparatus and an optical system, and particularly relates to a head-mounted display apparatus and an optical system.

Description of Related Art

Near-eye displays (NED) and head-mounted displays (HMD) are extremely amazing products of a next generation with a great development potential. Related applications of the NED technique include an augmented reality (AR) technique and a virtual reality (VR) technique. Regarding the AR technique, people in the related art devote to provide optimal image quality under a premise of a thin and slim volume.

In a conventional optical lens module of the HMD to implement the AR technique, an image light is transmitted through the optical lens module to enter user's eyes after the image light is emitted by a display apparatus. When the image beam and an external ambient beam enter the user's eyes simultaneously, the AR display effect is realized. However, the conventional optical lens module of the HMD is inevitably appeared in an angle of view of the user's eyes, and the conventional optical lens module also occupies a certain volume. Therefore, a field of view (FOV) of the image actually displayed by the HMD is greatly limited. In order to achieve a wider FOV, a beam splitter array within one optical waveguide device is one of the optical structures of the NED/HMD for implement AR display effect, which is another choice for balancing factors of wider FOV, full-color image and light and slim volume. The optical waveguide device of such structure has a plurality of beam splitters capable of expanding the image light on a direction to guide the image light of the projection apparatus to the user's eyes. However, the image light needs to be expanded by adding a biconic lens due to the beam splitters can only expand the image light in one direction, so that the image light on the two directions is guided into the user's eyes. Furthermore, the biconic lens is very difficult to be fabricated, and it's hard to control the imaging quality when using the biconic lens in the HMD. As a result, the fabrication difficulty and the cost of HMD using at least one biconic lens is extremely high.

The information disclosed in this "Description of Related Art" section is only for enhancement of understanding of the background of the described technology and therefore it may contain information that does not form the prior art that is already known to a person of ordinary skill in the art. Further, the information disclosed in the "Description of Related Art" section does not mean that one or more problems to be resolved by one or more embodiments of the invention were acknowledged by a person of ordinary skill in the art.

SUMMARY OF THE INVENTION

The invention is directed to a head-mounted display (HMD) apparatus, and it has small volume, light weight and larger field of view. Besides, the fabrication difficulty of the HMD including a waveguide structure is comparative low, and the cost of the HMD including a waveguide structure is also comparative low.

The invention is directed to an optical system, when the optical system is applied to a HMD apparatus, the HMD apparatus has smaller volume, lighter weight and larger FOV. Besides, the fabrication difficulty and the cost of the HMD apparatus is comparatively lower than the conventional HMD.

The other objectives and advantages of the invention can be further understood through the technical features disclosed in the invention.

In order to achieve at least one of the above-mentioned objectives, an embodiment of the invention provides an optical system adapted to receive an image light. The optical system includes a first optical waveguide device and a second optical waveguide device. The first optical waveguide device includes a first light entering surface, a first light exiting surface and a first beam splitter. The image light enters the first optical waveguide device through the first light entering surface. The first light exiting surface is connected to the first light entering surface, and an angle between the first light entering surface and the first light exiting surface is less than 90 degrees. The first beam splitter is disposed in the first optical waveguide device. The second optical waveguide device is disposed beside the first optical waveguide device, and the second optical waveguide device includes a second light entering surface, a second light exiting surface and a second beam splitter. The second light entering surface is faces the first light exiting surface. The second light exiting surface is connected to the second light entering surface, and an angle between the second light entering surface and the second light exiting surface is less than 90 degrees. The second beam splitter is disposed in the second optical waveguide device. The second light entering surface and the first light exiting surface have a gap therebetween.

In order to achieve at least one of the above-mentioned objectives, an embodiment of the invention provides a head-mounted display (HMD) apparatus including a display, a first optical waveguide device and a second optical waveguide device. The display is configured to emit an image light. The first optical waveguide device includes a first light entering surface, a first light exiting surface and a first beam splitter. The image light enters the first optical waveguide device through the first light entering surface. The first light exiting surface is connected to the first light entering surface, and an angle between the first light entering surface and the first light exiting surface is less than 90 degrees. The first beam splitter is disposed in the first optical waveguide device. The second optical waveguide device is disposed beside the first optical waveguide device, and the second optical waveguide device includes a second light entering surface, a second light exiting surface and a second beam splitter. The second light entering surface is faces the first light exiting surface. The second light exiting surface is connected to the second light entering surface, and an angle between the second light entering surface and the second light exiting surface is less than 90 degrees. The second beam splitter is disposed in the second optical waveguide device. The second light entering surface and the first light exiting surface have a gap therebetween.

Based on the above, the embodiments of the invention have at least one of the advantages or effects below. In the head-mounted display (HMD) apparatus and the optical system of the embodiment of the invention, a first beam splitter is disposed in the first optical waveguide device, and a second beam splitter is disposed in the second optical waveguide device. Besides, the second light entering surface of the second optical waveguide device is faces the first light exiting surface of the first optical waveguide device, and the second light entering surface and the first light exiting surface have a gap therebetween. Therefore, when the optical system is applied to the HMD apparatus, the image light of the HMD apparatus needs not to be expanded by disposing an extra biconic lens. The image light may be expanded by the first optical waveguide device and the second optical waveguide device in two different directions, so that the image light in the two directions may be guided to the user's eyes. As a result, the HMD apparatus has smaller volume, lighter weight and larger FOV. Besides, the fabrication of the HMD apparatus is easier. And the cost of the HMD apparatus is comparatively lower than the conventional HMD.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
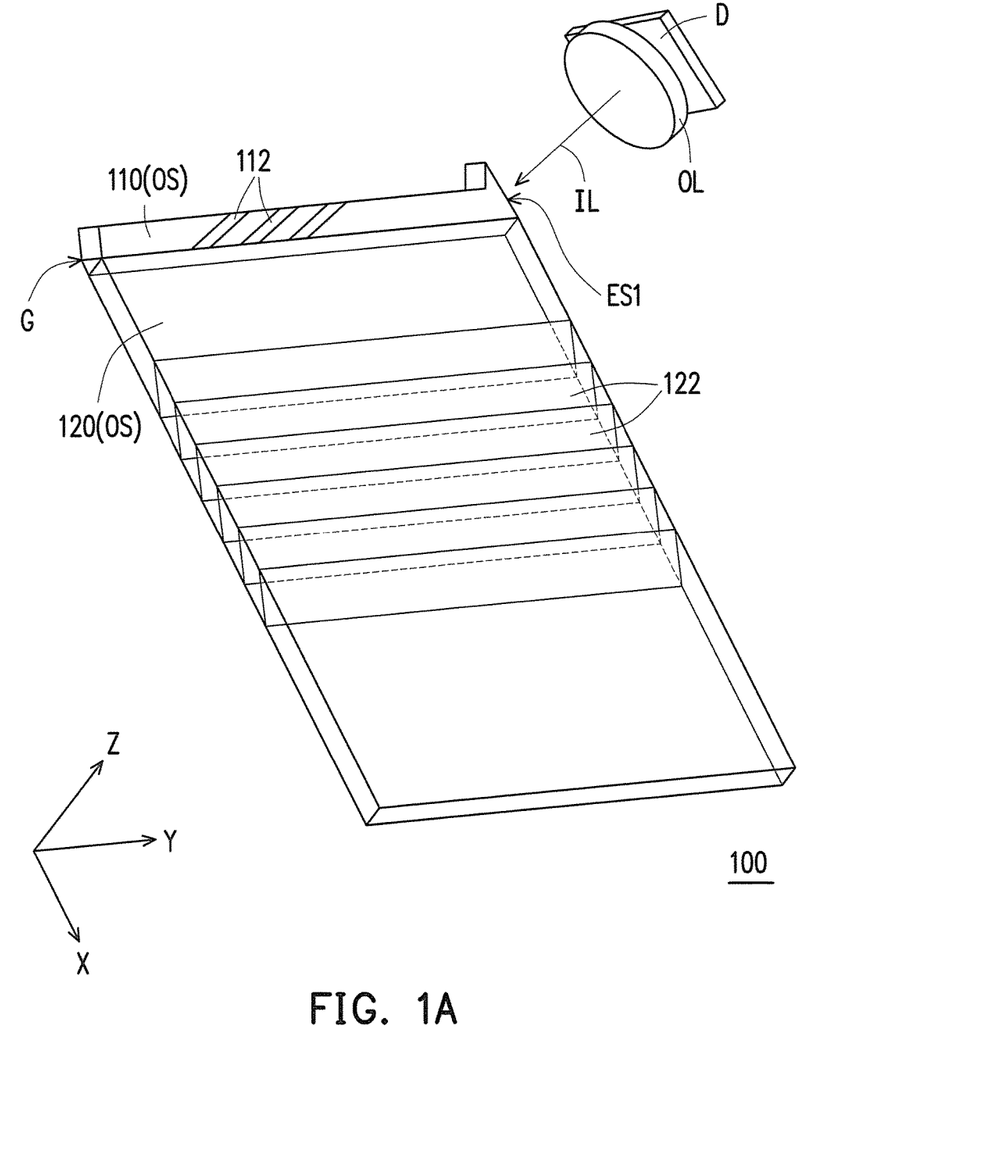
FIG. 1A is a schematic perspective view of a head-mounted display (HMD) apparatus in an embodiment of the invention.

FIG. 1A is a schematic perspective view of a head-mounted display (HMD) apparatus in an embodiment of the invention. Referring to FIG. 1A, in the embodiment, the head-mounted display apparatus 100 includes a display D and an optical system OS. The optical system OS includes a first optical waveguide device 110 and a second optical waveguide device 120, and the second optical waveguide device 120 is disposed beside the first optical waveguide device 110. The first optical waveguide device 110 includes a plurality of first beam splitters 112 disposed therein, and the first beam splitters 112 are parallel to each other and are arranged in intervals (i.e. two adjacent first beam splitters 112 have an interval therebetween). The second optical waveguide device 120 includes a plurality of second beam splitters 122 disposed therein, and the second beam splitters 122 are parallel to each other and are arranged in intervals (i.e. two adjacent second beam splitters 122 have an interval therebetween). On the other hand, the first optical waveguide device 110 includes a first light entering surface ES1. The display D is configured to emit an image light IL, and the image light IL enters the first optical waveguide device 110 through the first light entering surface ES1. To be specific, the display D includes an optical lens OL, and image light IL enters the first optical waveguide device 110 through the first light entering surface ES1 after passing through the optical lens OL. In the embodiment, the HMD apparatus 100 is, for example, located in a coordinate system constructed by a first axis X, a second axis Y and a third axis Z, where the direction of the first axis X is parallel to an arranging direction of the second beam splitters 122, and the direction of the second axis Y is parallel to an arranging direction of the first beam splitters 112. Moreover, the direction of the first axis X is perpendicular to the direction of the second axis Y, and the direction of the third axis Z is perpendicular to the direction of the first axis X and the direction of the second axis Y.

Figure 1B:
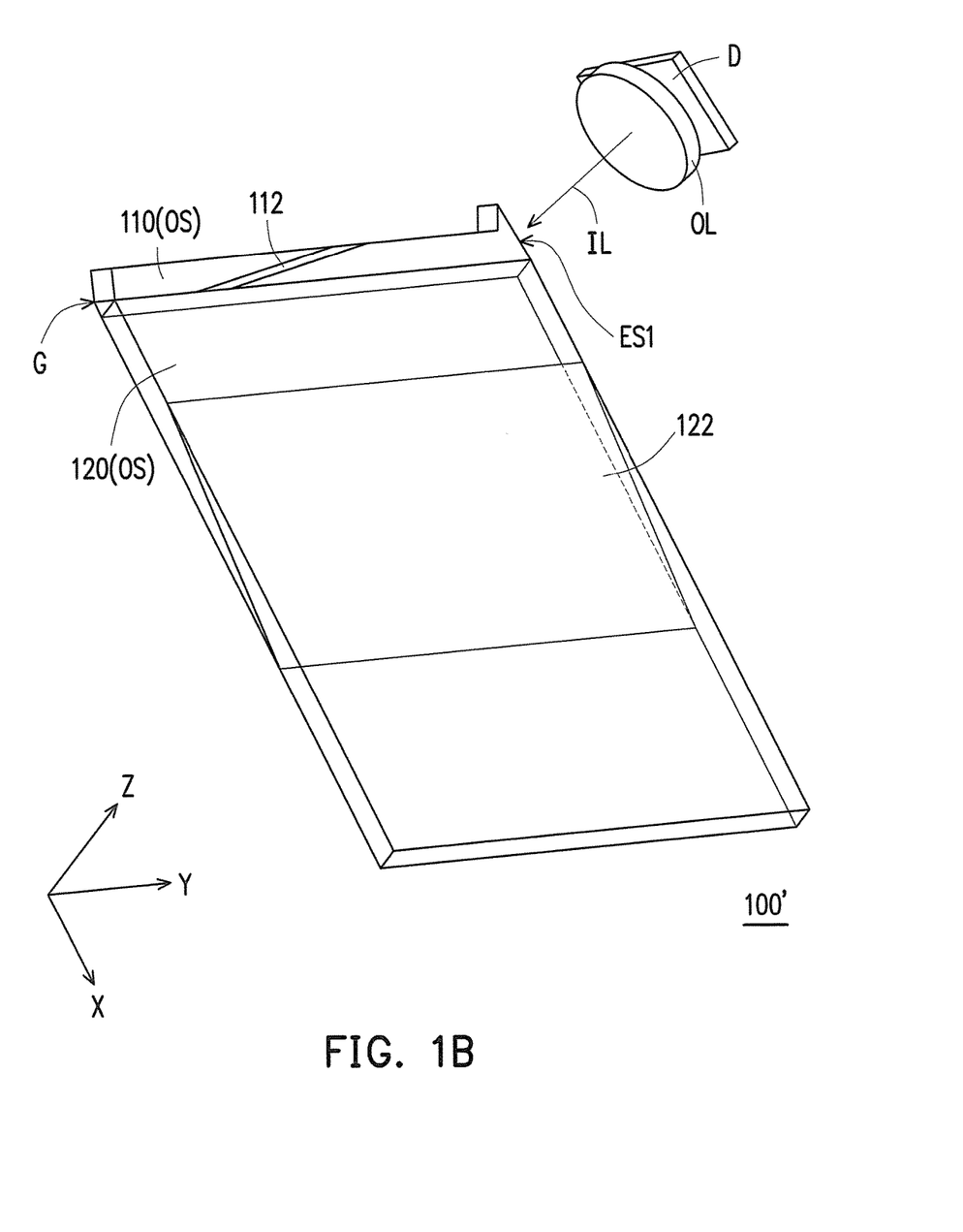
FIG. 1B is a schematic perspective view of a head-mounted display (HMD) apparatus in another embodiment of the invention.

FIG. 1B is a schematic perspective view of a head-mounted display (HMD) apparatus in another embodiment of the invention. Referring to FIG. 1B, in the embodiment, the head-mounted display apparatus 100' is similar to the aforementioned head-mounted display apparatus 100 described in FIG. 1A, and details thereof are not repeated herein. The difference between the head-mounted display apparatus 100 and the head-mounted display apparatus 100' is that the first optical waveguide device 110 includes only one first beam splitter 112 disposed therein and the second optical waveguide device 120 includes only one second beam splitter 122 disposed therein. Thus, the head-mounted display apparatus 100' may decrease the fabrication difficulty of the first beam splitter 112 and the second beam splitter 122 and still preserve the imaging quality.

Figure 2:
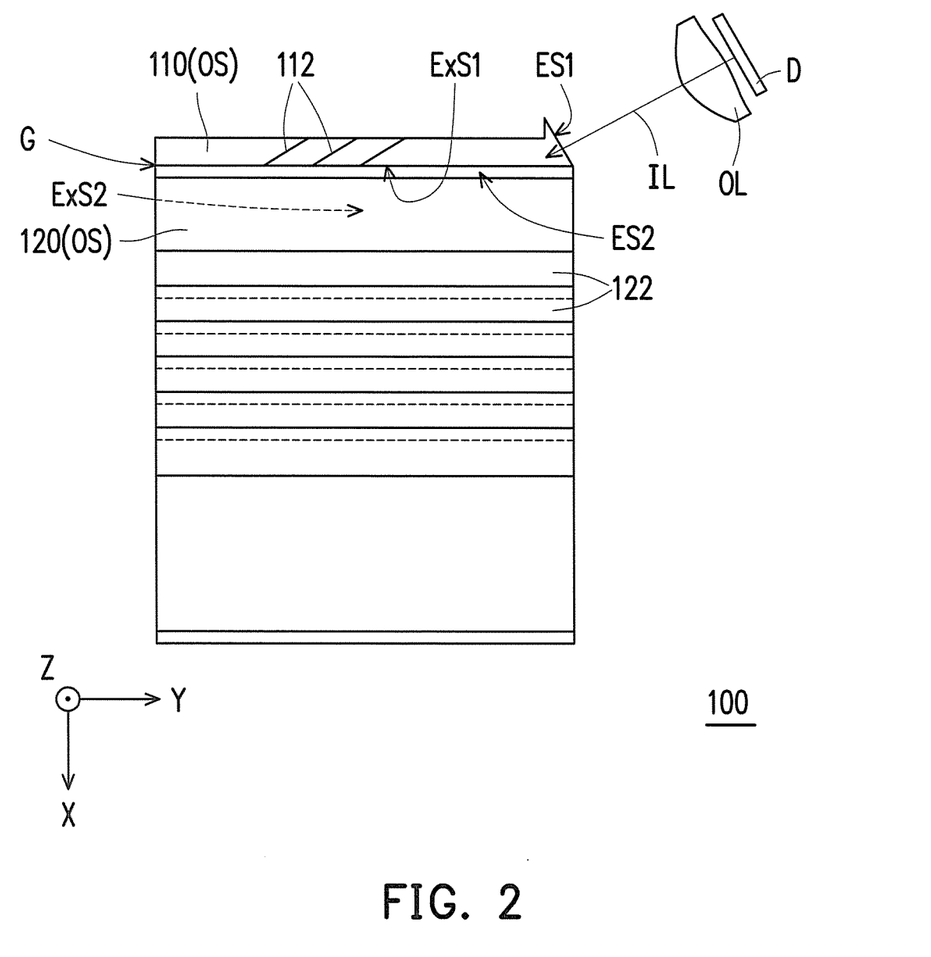
FIG. 2 is a schematic top view illustrating the HMD apparatus in the embodiment of FIG. 1A.

FIG. 2 is a schematic top view illustrating the HMD apparatus in the embodiment of FIG. 1A. The viewing direction is perpendicular to a second light exiting surface ExS2 of the second optical waveguide device 120 of the HMD apparatus 100. Referring to FIG. 2, in the embodiment, the first optical waveguide device 110 further includes a first light exiting surface ExS1, and the first light exiting surface ExS1 is connected to the first light entering surface ES1. Besides, the second optical waveguide device 120 includes a second light entering surface ES2 and the second light exiting surface ExS2. The second light entering surface ES2 is facing the first light exiting surface ExS1, and the second light exiting surface ExS2 is connected to the second light entering surface ES2. To be specific, the image light IL entered the first optical waveguide device 110 is reflected by the first beam splitters 112 to leave the first optical waveguide device 110 through the first light exiting surface ExS1. Then, the image light IL left the first optical waveguide device 110 is entered the second optical waveguide device 120 through a gap G (more specifically shown in FIG. 4) and the second light entering surface ES2. The image light IL is then reflected by the second beam splitters 122 to leave the second optical waveguide device 120 through the second light exiting surface ExS2. To be specific, the image light IL is adapted to be totally reflected to transmit in the first optical waveguide device 110 and the second optical waveguide device 120.

Figure 3:
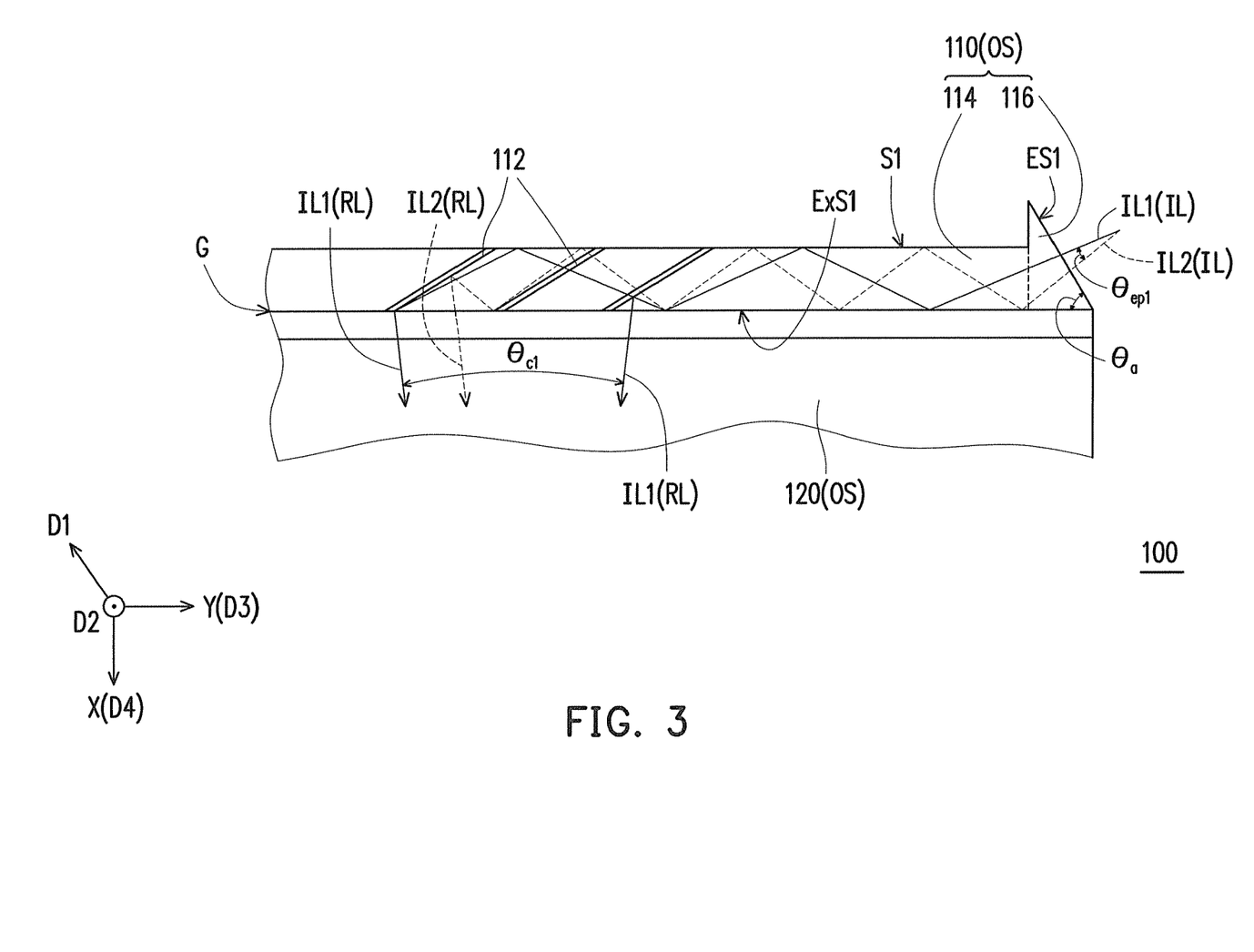
FIG. 3 is a schematic view illustrating a light path of the image light transmitting in the first optical waveguide device in the embodiment of FIG. 1A.
Figure 4:
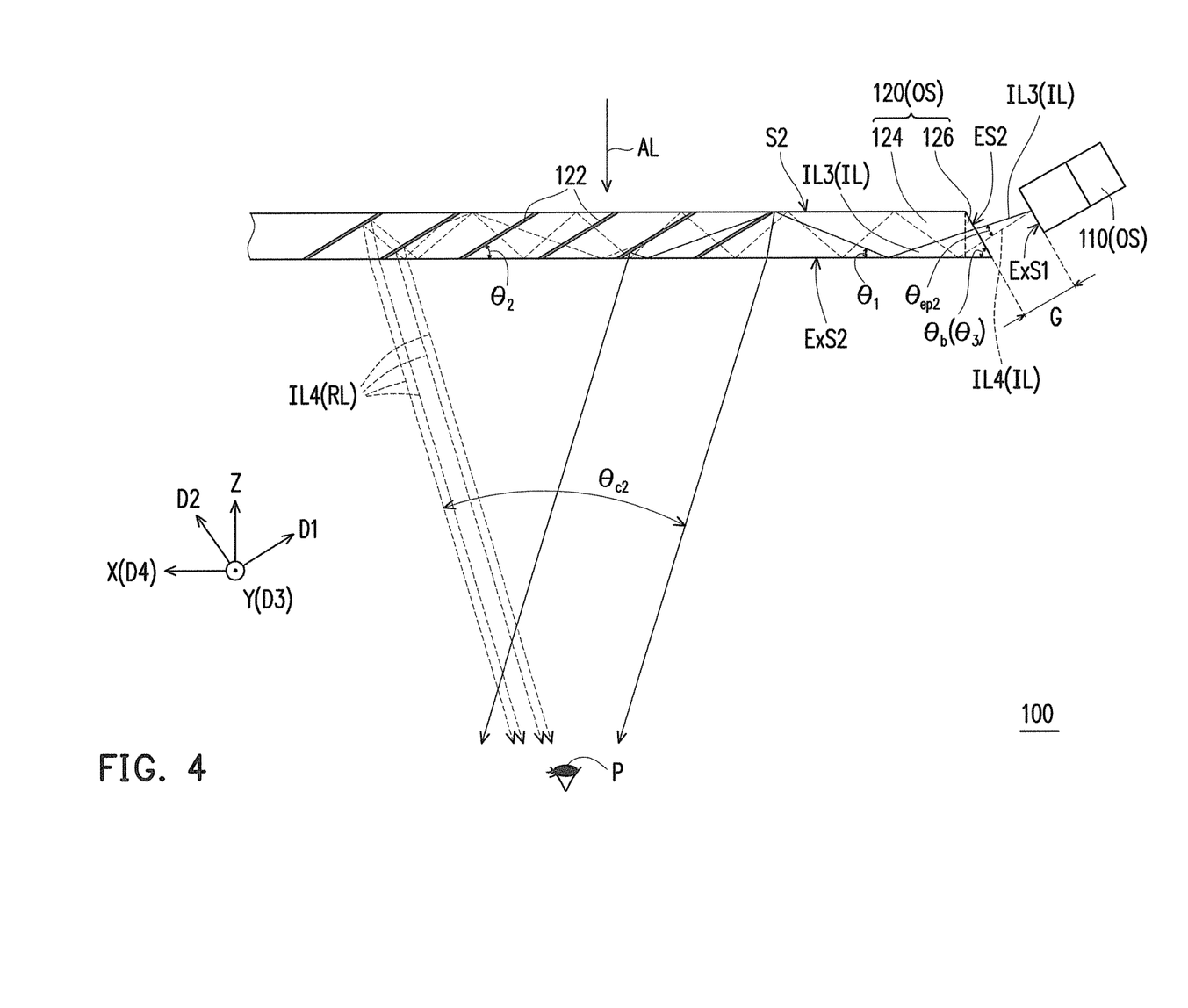
FIG. 4 is a schematic view illustrating a light path of the image light transmitting from the second optical waveguide device to the pupil in the embodiment of FIG. 1A.

FIG. 3 is a schematic view illustrating a light path of the image light transmitting in the first optical waveguide device in the embodiment of FIG. 1A, and FIG. 4 is a schematic view illustrating a light path of the image light transmitting from the second optical waveguide device to the pupil in the embodiment of FIG. 1A. Referring to FIG. 3, in the embodiment, the first optical waveguide device 110 further includes a first side surface S1 connected to the first light entering surface ES1, and the first side surface S1 is parallel to the first light exiting surface ExS1. The first beam splitters 112 are disposed between the first side surface S1 and the first light exiting surface ExS1, and the first beam splitters 112 are not parallel to the first side surface S1 and not parallel to the first light entering surface ES1. Moreover, referring to FIG. 4, the second light entering surface ES2 of the second optical waveguide device 120 is facing the first light exiting surface ExS1 of the first optical waveguide device 110, and the second light entering surface ES2 and the first light exiting surface ExS1 have the gap G therebetween (more specifically shown in FIG. 4). To be specific, the first light exiting surface ExS1 is parallel to the second light entering surface ES2, and a width of the gap G between the second light entering surface ES2 and the first light exiting surface ExS1 is ranged in 2 micrometers to 200 micrometers, preferably, for example, is between 12 micrometers and 175 micrometers. However, in other embodiments, the width of the gap G may also be ranged between other values, such as be ranged between 25 micrometers and 100 micrometers, where the invention is not limited thereto. Besides, the first optical waveguide device 110 and the second optical waveguide device 120 are, for example, adhered together by an optical clear adhesive (OCA), such as resistive-type or capacitive-type, the invention is not limited thereto. For example, the OCA adheres the first light exiting surface ExS1 and the second light entering surface ES2 to fix the first optical waveguide device 110 and the second optical waveguide device 120. To be specific, the OCA is, for example, coated to the position near edges of the first light exiting surface ExS1 and the second light entering surface ES2, or coated to the corners of the first light exiting surface ExS1 and the second light entering surface ES2 to form the gap G. On the other hand, the relative positions of the first optical waveguide device 110 and the second optical waveguide device 120 can be fixed by other fixtures, so that the gap G is formed between the first light exiting surface ExS1 and the second light entering surface ES2, the invention is not limited thereto. The gap G is, for example, filled by the air. However, in some embodiments, the gap G may be also filled by transparent material, for example, the transparent material which refraction index is close to air and is comparatively lower than the refraction index of the first optical waveguide device 110 and the second optical waveguide device 120, the invention is not limited thereto.

Referring to FIG. 3 again, in the embodiment, the first optical waveguide device 110 includes a first body portion 114 and a first wedge portion 116. The first wedge portion 116 is adhered to the first body portion 114. However, the first body portion 114 and the first wedge portion 116 may also be integrated with each other, the invention is not limited thereto. The first beam splitters 112 are disposed in the first body portion 114. The first light entering surface ES1 of the first wedge portion 116 is away of the first body portion 114, and the first light exiting surface ExS1 is formed by the first body portion 114 and the first wedge portion 116 together. Besides, an angle $\theta_a$ between the first light entering surface ES1 and the first light exiting surface ExS1 is less than 90 degrees. Most of the image light IL enters into the first optical waveguide device 110 through the first light entering surface ES1, and then the image light IL is transmitted to the first beam splitters 112 by total internal reflection between the first side surface S1 and the first light exiting surface ExS1. To be specific, most of the image light IL entering into the first optical waveguide device 110, an incident angle of the image light IL incident to the first side surface S1 and the first light exiting surface ExS1 is greater than a critical angle of total internal reflection, such that the image light IL is transmitted to the first beam splitters 112 in the manner of total internal reflection. Then, a part of the image light IL is reflected by at least one of the first beam splitters 112, and leaves the first optical waveguide device 110 through the first light exiting surface ExS1. In the embodiment, at least a part of the first beam splitters 112 reflects a part of the image light IL, and another part of the image light IL passes through the first beam splitters 112.

Referring to FIG. 4, in the embodiment, the second optical waveguide device 120 further includes a second side surface S2 connected to the second light entering surface ES2, and the second side surface S2 is parallel to the second light exiting surface ExS2. The second beam splitters 122 are disposed between the second side surface S2 and the second light exiting surface ExS2, and the second beam splitters 122 are not parallel to the second side surface S2 and not parallel to the second light entering surface ES2. To be specific, the second optical waveguide device 120 includes a second body portion 124 and a second wedge portion 126. The second wedge portion 126 is adhered to the second body portion 124. However, the second body portion 124 and the second wedge portion 126 may also be integrated with each other, the invention is not limited thereto. The second beam splitters 122 are disposed in the second body portion 124. The second light entering surface ES2 of the second wedge portion 126 is away from the second body portion 124, and the second light exiting surface ExS2 is formed by the second body portion 124 and the second wedge portion 126 together. Besides, an angle $\theta_b$ between the second light entering surface ES2 and the second light exiting surface ExS2 is less than 90 degrees. In the embodiment, most of the image light IL enters into the second optical waveguide device 120 through the second light entering surface ES2 after leaving the first optical waveguide device 110, and then the image light IL is transmitted to the second beam splitters 122 by total internal reflection between the second side surface S2 and the second light exiting surface ExS2. To be specific, most of the image light IL entering into the second optical waveguide device 120, an incident angle of the image light IL incident to the second side surface S2 and the second light exiting surface ExS2 is greater than a critical angle of total internal reflection, such that the image light IL is transmitted to the second beam splitters 122 in the manner of total internal reflection. Then, a part of the image light IL is reflected by at least one of the second beam splitters 122, and leaves the second optical waveguide device 120 through the second light exiting surface ExS2. In the embodiment, at least a part of the second beam splitters 122 reflects a part of the image light IL, and another part of the image light IL passes through the second beam splitters 122. The image light IL left the second optical waveguide device 120 is adapted to enter a pupil P. In the embodiment, the pupil P is the user's eyes, however, the invention is not limited thereto.

In the embodiment, the image light IL is adapted to be totally reflected on the second light exiting surface ExS2 and have a first angle $\theta_1$ therebetween, and each of the second beam splitters 122 and the second light exiting surface ExS2 have a second angle $\theta_2$ therebetween. To be specific, the first angle $\theta_1$ is less than 90 degrees, and the second angle $\theta_2$ is also less than 90 degrees. Besides, a sum of the first angle $\theta_1$ and two times of the second angle $\theta_2$ is 90 degrees. In the embodiment, an index of refraction of the second wedge portion 126 of the second optical waveguide device 120 is the same as an index of refraction of the second body portion 124 of the second optical waveguide device 120. On the other hand, the second light entering surface ES2 and the second light exiting surface ExS2 have a third angle $\theta_3$ therebetween. To be specific, the third angle $\theta_3$ is the angle $\theta_b$. The second angle $\theta_2$ is less than 90 degrees, and the third angle $\theta_3$ is also less than 90 degrees. Besides, the third angle $\theta_3$ is equal to two times of the second angle $\theta_2$. However, in other embodiments, the index of refraction of the second wedge portion 126 may be different from the index of refraction of the second body portion 124. A sum of the first angle $\theta_1$ and two times of the second angle $\theta_2$ is still equal to 90 degrees. The invention is not limited thereto.

Referring both FIG. 3 and FIG. 4, in the embodiment, the image light IL has a first entrance pupil opening angle $\theta_{ep1}$ (as shown in FIG. 3) on a first direction D1 before the image light IL entering into the first optical waveguide device 110, and a second entrance pupil opening angle $\theta_{ep2}$ (as shown in FIG. 4) on a second direction D2 before the image light IL entering into the second optical waveguide 120. Besides, the image light IL emitted from the second optical waveguide device 120 and entered into the pupil P has a first light convergence angle $\theta_{c1}$ (as shown in FIG. 3) on a third direction D3 and a second light convergence angle $\theta_{c2}$ (as shown in FIG. 4) on a fourth direction D4. In the embodiment, the first direction D1 is perpendicular to the second direction D2, and the third direction D3 is perpendicular to the fourth direction D4. The first direction D1 is, for example, parallel to the first light entering surface ES1, and the second direction D2 is, for example, parallel to the second light entering surface ES2. The third direction D3 is, for example, parallel to the second axis Y, and the fourth direction D4 is, for example, parallel to the first axis X. To be specific, when the image light IL transmitting in the first optical waveguide device 110, the second entrance pupil opening angle $\theta_{ep2}$ and the second light convergence angle $\theta_{c2}$ of the image light IL are substantially the same. Besides, when the image light IL transmitting in the second optical waveguide device 120, the first entrance pupil opening angle $\theta_{ep1}$ and the first light convergence angle $\theta_{c1}$ are substantially the same. For clearly illustrating the entrance pupil opening angles and the light convergence angles on different directions, the first entrance pupil opening angle $\theta_{ep1}$ shown in FIG. 3 and the second entrance pupil opening angle $\theta_{e2}$ shown in FIG. 4 can represent to the first entrance pupil opening angle $\theta_{ep1}$ of the image light IL before entering the first optical waveguide device 110 on the first direction D1 and the second entrance pupil opening angle $\theta_{ep2}$ of the image light IL before entering the first optical waveguide device 110 on the second direction D2 respectively. Besides, the first light convergence angle $\theta_{c1}$ shown in FIG. 3 and the second light convergence angle $\theta_{c2}$ shown in FIG. 4 can represent to the first light convergence angle $\theta_{c1}$ of the image light IL entered into the pupil P on the third direction D3 and the second light convergence angle $\theta_{c2}$ of the image light IL entered into the pupil P on the fourth direction D4.

Referring to FIG. 3, the image light IL includes an image light IL1 and an image light IL2 located on the edge of the image light IL respectively, so that the first entrance pupil opening angle $\theta_{ep1}$ and the first light convergence angle $\theta_{c1}$ of the image light IL can be clearly illustrated. In the embodiment, before entering into the first optical waveguide device 110, the first entrance pupil opening angle $\theta_{ep1}$ on the first direction D1 is formed by the image light IL1 and the image light IL2 therebetween. The image light IL1 and the image light IL2 are totally internal reflected to transmit to the first beam splitters 112, and then a part of the image light IL1 and the image light IL2 are reflected by at least one of the first beam splitters 112 to form the reflective light RL. After that, the reflective light RL leaves the first optical waveguide device 110 through the first light exiting surface ExS1. The first light convergence angle $\theta_{c1}$ on the third direction D3 is formed by the image light IL1 and the image light IL2 left from the first optical waveguide device 110 therebetween. To be specific, the first entrance pupil opening angle $\theta_{ep1}$ is substantially equal to the first light convergence angle $\theta_{c1}$.

Referring to FIG. 4, the image light IL further includes an image light IL3 and an image light IL4 located on the edge of the image light IL respectively, so that the second entrance pupil opening angle $\theta_{ep2}$ and the second light convergence angle $\theta_{c2}$ of the image light IL can be clearly illustrated. In the embodiment, before entering into the second optical waveguide device 120, the second entrance pupil opening angle $\theta_{ep2}$ on the second direction D2 is formed by the image light IL3 and the image light IL4 therebetween. The image light IL3 and the image light IL4 are totally internal reflected to transmit to the second beam splitters 122, and then a part of the image light IL3 and the image light IL4 are reflected by at least one of the second beam splitters 122 to form the reflective light RL. After that, the reflective light RL leaves the second optical waveguide device 120 through the second light exiting surface ExS2, and the reflective light RL (the image light IL3 and the image light IL4) left the second optical waveguide device 120 enters into the pupil P. The second light convergence angle $\theta_{c2}$ on the fourth direction D4 is formed by the image light IL3 and the image light IL4 left from the second optical waveguide device 120 therebetween. To be specific, the second entrance pupil opening angle $\theta_{ep2}$ is substantially equal to the second light convergence angle $\theta_{c2}$.

Moreover, in the embodiment, the first optical waveguide device 110 and the second optical waveguide device 120 can be made of a transparent material (for example, glass, acrylic, or other suitable materials), such that an ambient light AL coming from external may pass through the second optical waveguide device 120. In the embodiment, for example, the image light IL is transmitted by the first optical waveguide device 110 and the second optical waveguide device 120, and the image light IL leaves from the second optical waveguide device 120 through the second light exiting surface ExS2. When the eyes of a user are, for example, located near the second light exiting surface ExS2 of the second optical waveguide device 120, the image light IL leaving the second optical waveguide device 120 may enter into the eyes of the user, and the ambient light AL coming from external may also pass through the second optical waveguide device 120 to enter into the eyes of the user. Therefore, when the HMD apparatus 100 is placed in front of the eyes of the user to allow the image light IL and the ambient light AL enter into the eyes of the user, the user may view a display image (not shown) corresponding to the image light IL, and the user may also view an external image (not shown) corresponding to the ambient light AL, so as to achieve AR display effect. In the embodiment, the display D is, for example, a liquid crystal display (LCD), a plasma display, an organic light-emitting diode (OLED) display, an electrowetting display (EWD), an electro-phoretic display (EPD), an electrochromic display (ECD), a digital micro-mirror device (DMD) or other suitable displays. Moreover, the display D may also be used in collaboration with a projection optical device to provide the image light IL, which is not limited by the invention.

In the embodiment, reflectivity of the first beam splitters 112 are gradually increased along a direction away from the first light entering surface ES1 and parallel to the first side surface S1. Moreover, transmittance of the first beam splitters 112 are gradually decreased along the direction away from the first light entering surface ES1 and parallel to the first side surface S1. To be specific, the reflectivity of the first beam splitters 112 are gradually increased along a direction opposite to the direction of the second axis Y (e.g. −Y direction shown in FIG. 1), and the transmittance of the first beam splitters 112 are also gradually decreased along the direction opposite to the direction of the second axis Y. Besides, in the embodiment, reflectivity of the second beam splitters 122 are gradually increased along a direction away from the second light entering surface ES2 and parallel to the second side surface S2. Moreover, transmittance of the second beam splitters 122 are gradually decreased along the direction away from the second light entering surface ES2 and parallel to the second side surface S2. To be specific, the reflectivity of the second beam splitters 122 are gradually increased along the direction of the first axis X (e.g. +X direction shown in FIG. 2), and the transmittance of the second beam splitters 122 are gradually decreased along the direction of the first axis X. Based on the above design of the reflectivity and the transmittance of the first beam splitters 112 and the second beam splitters 122, a light intensity of the image light IL is gradually decreased during the process of sequentially passing through the first beam splitters 112 and the second beam splitters 122. The light intensity of the image light IL reflected by the first beam splitters 112 can be maintained consistent along the direction of the second axis Y, and the light intensity of the image light IL reflected by the second beam splitters 122 can be maintained consistent along the direction of the first axis X. When the user sees the display image (not shown) corresponding to the image light IL, a light intensity the display image seen by the user won't be uneven, that is to say, a part of the display image has both lower brightness and higher brightness simultaneously won't be appeared.

Moreover, in the embodiment, the first beam splitters 112 of the first optical waveguide device 110 are arranged in equal intervals, and the second beam splitters 122 of the second optical waveguide device 120 are also arranged in equal intervals. However, in other embodiments, the first beam splitters 112 of the first optical waveguide device 110 and the second beam splitters 122 of the second optical waveguide device 120 can also be arranged in unequal intervals according to actual needs of optical requirement, the invention is not limited thereto. Furthermore, the image light IL can be transmitted to the user's eyes through the first optical waveguide device 110 and the second optical waveguide device 120 by suitably designing inclining angles between the first light entering surface ES1 and the first beam splitters 112 and suitably designing inclining angles between the second light entering surface ES2 and the second beam splitters 122.

In the embodiment, the second light entering surface ES2 of the second optical waveguide device 120 is faces to the first light exiting surface ExS1 of the first optical waveguide device 110, and the gap G is formed between the second light entering surface ES2 and the first light exiting surface ExS1. Because the gap G is formed between the second light entering surface ES2 and the first light exiting surface ExS1, the image light IL may be totally internal reflected to transmit in the first optical waveguide device 110. The image light IL will not enter the second optical waveguide device 120 directly when the image light IL is not reflected by the first beam splitters 112. Therefore, when the image light IL is transmitted in the first optical waveguide device 110 and the second optical waveguide device 120, the image light IL may be expanded on two directions (e.g., the first direction X and the second direction Y). Therefore, the entrance pupil positions on the two directions can be adjusted to be located at the entrance of the optical system OS, e.g., the first light entering surface ES1, so that the volume of the HMD apparatus 100 may be reduced significantly by comparison of the conventional HMD using optical lens module. Besides, since the HMD apparatus 100 has a more simplified optical system, the weight of the HMD apparatus 100 can be reduced, and the field of view of the HMD apparatus 100 can be enlarged. For example, the half field of view (HFOV) of the HMD apparatus 100 may reach 20 degrees when using a 0.24-inch display panel. In contrast, the conventional HMD apparatus including one waveguide device and biconic lens needs to use a 0.37-inch display panel to enlarge the HFOV of the HMD apparatus to reach 20 degrees. As a result, the HMD apparatus 100 in the embodiment of the invention has small volume, light weight and larger field of view. Moreover, the image light IL of the HMD apparatus 100 in the embodiment of the invention doesn't need to expand the image light by disposing an extra biconic lens, where the biconic lens has high fabrication difficulty, and the imaging quality of the biconic lens is difficult to control. Therefore, the fabrication difficulty and the cost of the HMD apparatus in the embodiment of the invention is comparative low.

In summary, the embodiments of the invention have at least one of the following advantages and effects. In the HMD apparatus and the optical system of the embodiment of the invention, a plurality of first beam splitters are disposed in the first optical waveguide device, and the first beam splitters are parallel to each other and are arranged in intervals. A plurality of second beam splitters are disposed in the second optical waveguide device, and the second beam splitters are parallel to each other and are arranged in intervals. Besides, the second light entering surface of the second optical waveguide device is faces to the first light exiting surface of the first optical waveguide device, and a gap is formed between the second light entering surface and the first light exiting surface. Therefore, when the optical system is applied to the HMD apparatus, the image light of the HMD apparatus needs not to be expanded by disposing an extra biconic lens. The image light may be expanded by the first optical waveguide device and the second optical waveguide device on two directions, so that the image light on the two directions may be guided into the user's eyes. As a result, the HMD apparatus has smaller volume, lighter weight and larger field of view by comparison of the conventional HMD using optical lens module. Besides, the fabrication difficulty and the cost of the HMD apparatus is comparative low instead of the conventional HMD device including one waveguide device and the extra biconic lens.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention s limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A head-mounted display apparatus, comprising:
   a display, configured to emit an image light;
   a first optical waveguide device, comprising:
     a first light entering surface, wherein the image light enters the first optical waveguide device through the first light entering surface;
     a first light exiting surface, wherein the first light exiting surface is directly connected to the first light entering surface so as to form an angle that is less than 90 degrees and greater than 0 degree; and
     a first beam splitter, disposed in the first optical waveguide device; and
   a second optical waveguide device, disposed beside the first optical waveguide device, the second optical waveguide device comprising:
     a second light entering surface, facing the first light exiting surface;
     a second light exiting surface, wherein the second light exiting surface is directly connected to the second light entering surface so as to form an angle that is less than 90 degrees and greater than 0 degree; and
     a second beam splitter, disposed in the second optical waveguide device, wherein the second light entering surface and the first light exiting surface have a gap therebetween.

2. The head-mounted display apparatus as claimed in claim 1, wherein the image light entered the first optical waveguide device is adapted to reflect on the first beam splitter to leave the first optical waveguide device through the first light exiting surface, and the image light which left the first optical waveguide device is adapted to enter the second optical waveguide device through the second light entering surface, wherein the image light is adapted to reflect on the second beam splitter to leave the second optical waveguide device through the second light exiting surface.

3. The head-mounted display apparatus as claimed in claim 2, wherein the image light is adapted to be totally reflected to transmit in the first optical waveguide device and the second optical waveguide device.

4. The head-mounted display apparatus as claimed in claim 1, wherein the image light left the second optical waveguide device is adapted to enter a pupil, wherein before entering the first optical waveguide device, the image light has a first entrance pupil opening angle on a first direction and a second entrance pupil opening angle on a second direction, the image light which left the second optical waveguide device and entered the pupil has a first light convergence angle on a third direction and a second light convergence angle on a fourth direction, wherein the first direction is perpendicular to the second direction, the third direction is perpendicular to the fourth direction, the first entrance pupil opening angle is equal to the first light convergence angle, and the second entrance pupil opening angle is equal to the second light convergence angle.

5. The head-mounted display apparatus as claimed in claim 1, wherein the first optical waveguide device further comprises a first side surface connected to the first light entering surface, and the first side surface is parallel to the first light exiting surface, the second optical waveguide device further comprises a second side surface connected to the second light entering surface, and the second side surface is parallel to the second light exiting surface, wherein the first beam splitter is disposed between the first side surface and the first light exiting surface and the second beam splitter is disposed between the second side surface and the second light exiting surface.

6. The head-mounted display apparatus as claimed in claim 5, wherein the first beam splitter is not parallel to the first side surface and not parallel to the first light entering surface, and the second beam splitter is not parallel to the second side surface and not parallel to the second light entering surface.

7. The head-mounted display apparatus as claimed in claim 5, wherein the image light is adapted to be totally reflected to transmit between the first side surface and the first light exiting surface, and the image light is adapted to be totally reflected to transmit between the second side surface and the second light exiting surface, wherein the second light exiting surface and the image light adapted to be totally reflected on the second light exiting surface have a first angle therebetween, the second beam splitter and the second light exiting surface have a second angle therebetween, the first angle plus the second angle is less than 90 degrees, and a sum of the first angle and two times of the second angle is 90 degrees.

8. The head-mounted display apparatus as claimed in claim 1, wherein the first optical waveguide device comprises a first body portion and a first wedge portion adjacent to the first body portion, the first beam splitter is disposed in the first body portion, a surface of the first wedge portion away of the first body portion is the first light entering surface, and the first body portion and the first wedge portion form the first light exiting surface together.

9. The head-mounted display apparatus as claimed in claim 1, wherein the second optical waveguide device comprises a second body portion and a second wedge portion adjacent to the second body portion, the second beam splitter is disposed in the second body portion, a surface of the second wedge portion away of the second body portion is the second light entering surface, and the second body portion and the second wedge portion form the second light exiting surface together.

10. The head-mounted display apparatus as claimed in claim 9, wherein an index of refraction of the second wedge portion is the same as an index of refraction of the second body portion, the second light entering surface and the second light exiting surface have a third angle therebetween, the second beam splitter and the second light exiting surface have a second angle therebetween, the second angle and the third angle is less than 90 degrees, and the third angle is equal to two times of the second angle.

11. The head-mounted display apparatus as claimed in claim 1, wherein a width of the gap is ranged in 2 micrometers to 200 micrometers.

12. The head-mounted display apparatus as claimed in claim 1, wherein the first light exiting surface is parallel to the second light entering surface.

13. The head-mounted display apparatus as claimed in claim 1, wherein the number of the first beam splitter is more than one, and the first beam splitters are parallel to each other and are arranged in intervals.

14. The head-mounted display apparatus as claimed in claim 1, wherein the number of the second beam splitter is more than one, and the second beam splitters are parallel to each other and are arranged in intervals.

15. An optical system, adapted to receive an image light, the optical system comprising:
a first optical waveguide device, comprising:
a first light entering surface, wherein the image light enters the first optical waveguide device through the first light entering surface;
a first light exiting surface, wherein the first light exiting surface is directly connected to the first light entering surface so as to form an angle that is less than 90 degrees and greater than 0 degree; and
a first beam splitter, disposed in the first optical waveguide device; and
a second optical waveguide device, disposed beside the first optical waveguide device, the second optical waveguide device comprising:
a second light entering surface, facing the first light exiting surface;
a second light exiting surface, wherein the second light exiting surface is directly connected to the second light entering surface so as to form an angle that is less than 90 degrees and greater than 0 degree; and
a second beam splitter, disposed in the second optical waveguide device, wherein the second light entering surface and the first light exiting surface have a gap therebetween.

16. The optical system as claimed in claim 15, wherein the number of the first beam splitter is more than one, and the first beam splitters are parallel to each other and are aiTanged in intervals.

17. The optical system as claimed in claim 15, wherein the number of the second beam splitter is more than one, and the second beam splitters are parallel to each other and are arranged in intervals.

* * * * *